(12) United States Patent
Miyabayashi et al.

(10) Patent No.: US 6,271,285 B1
(45) Date of Patent: Aug. 7, 2001

(54) INK COMPOSITION FOR INK JET RECORDING

(75) Inventors: Toshiyuki Miyabayashi, Nagano; Yasushi Takamatsu, Yokohama; Futoshi Hoshino, Tokyo; Masatoshi Kaneko; Toshihiro Yoshimura, both of Yokohama, all of (JP)

(73) Assignee: Seiko Epson Corporation, Tokyo-To (JP)

( * ) Notice: Subject to any disclaimer, the term of this patent is extended or adjusted under 35 U.S.C. 154(b) by 0 days.

(21) Appl. No.: 09/049,878

(22) Filed: Mar. 27, 1998

(30) Foreign Application Priority Data

Mar. 28, 1997 (JP) .................................. 9-077579

(51) Int. Cl.⁷ .................. C08F 220/06; C08F 269/00; C08L 33/02; C08L 33/06; C09D 11/10
(52) U.S. Cl. .................. 523/160; 523/161; 523/201; 526/306.6
(58) Field of Search .................. 523/160, 161, 523/201; 526/307.6, 307.7; 106/31.6

(56) References Cited

U.S. PATENT DOCUMENTS

| | | | |
|---|---|---|---|
| 4,165,406 | * 8/1979 | Tugukuni et al. | 428/407 |
| 4,623,689 | 11/1986 | Shintani et al. | 524/457 |
| 4,948,772 | * 8/1990 | Hoshino et al. | 503/207 |
| 5,216,044 | * 6/1993 | Hoshino et al. | 523/201 |
| 5,443,628 | * 8/1995 | Loria et al. | 106/31.65 |
| 5,503,664 | * 4/1996 | Sano et al. | 524/27 |
| 5,623,296 | * 4/1997 | Fujino et al. | 347/103 |
| 5,748,208 | * 5/1998 | Uchiyama et al. | 347/103 |
| 5,814,685 | * 9/1998 | Satake et al. | 523/201 |
| 5,846,306 | * 12/1998 | Kubota et al. | 106/31.75 |
| 5,856,377 | * 1/1999 | Sato et al. | 523/201 |
| 5,886,079 | * 3/1999 | Saibara et al. | 524/458 |

FOREIGN PATENT DOCUMENTS

| | | |
|---|---|---|
| 0343833 | 11/1989 | (EP) . |
| 0796901 | 9/1997 | (EP) . |
| 55-018412 | 2/1980 | (JP) . |
| 55-157668 | 12/1980 | (JP) . |
| 56-028256 | 3/1981 | (JP) . |
| 56-147859 | 11/1981 | (JP) . |
| 56-147860 | 11/1981 | (JP) . |
| 62-184072 | 8/1987 | (JP) . |
| 1-217088 | 8/1989 | (JP) . |
| 2-276874 | 11/1990 | (JP) . |
| 3-056573 | 3/1991 | (JP) . |
| 3-060068 | 3/1991 | (JP) . |
| 3-160069 | 7/1991 | (JP) . |
| 4-018462 | 1/1992 | (JP) . |
| 04076004 | 3/1992 | (JP) . |
| 4-076004 | 3/1992 | (JP) . |
| 05170831 | 7/1993 | (JP) . |
| 07126595 | 5/1995 | (JP) . |
| 7-224239 | 8/1995 | (JP) . |
| 7-278479 | 10/1995 | (JP) . |
| 08188604 | 7/1996 | (JP) . |
| 8-259869 | 10/1996 | (JP) . |

OTHER PUBLICATIONS

Lewis Sr., Richard J.; Hawley's Condensed Chemical Dictionary, John Wiley and Sons, New York (p. 375), 1997.*
Morgans, W.M.; Outlines of Paint Technology vol. 1, John Wiley and Sons, New York (p. 274), 1982.*
Atkins, P.W.; Physical Chemistry, W.M. Freeman and Company, New York (pp. 464–465), 1986.*
Patent Abstracts of Japan of 55018412 dated Feb. 8, 1980.
Patent Abstracts of Japan of 5515768 dated Dec. 8, 1980.
Patents Abstracts of Japan of 56028256 dated Mar. 19, 1981.
Patent Abstracts of Japan of 56147859 dated Nov. 17, 1981.
Patent Abstracts of Japan of 56147860 dated Nov. 17, 1981.
Patent Abstracts of Japan of 62184072 dated Aug. 12, 1987.
Patent Abstracts of Japan of 01217088 dated Aug. 30, 1989.
Patent Abstracts of Japan of 02276874 dated Nov. 13, 1990.
Patent Abstracts of Japan of 03056573 dated Mar. 12, 1991.
Patents Abstracts of Japan of 03060068 dated Mar. 15, 1991.
Patents Abstracts of Japan of 03160069 dated Jul. 10, 1991.
Patents Abstracts of Japan of 04018462 dated Jan. 22, 1992.
Patent Abstracts of Japan of 04076004 dated Mar. 10, 1992.
Patent Abstracts of Japan of 07224239 dated Aug. 22,1995.
Patent Abstracts of Japan of 07278479 dated Oct. 24, 1995.
Patent Abstracts of Japan of 08259869 dated Oct. 8, 1996.
Patent Abstracts of Japan, vol. 16, No. 289 of JP 04 076004 dated Mar. 10, 1992.
Patent Abstracts of Japan, vol. 17, No. 582 of JP 05 170831 dated Jul. 9, 1993.
Patents Abstracts of Japan, vol. 95, No. 8 of JP 07 126595 dated May 1995.
Patent Abstracts of Japan, vol. 96, No. 11 of JP 08 188604 dated Jul. 1996.

* cited by examiner

Primary Examiner—Vasu Jagannathan
Assistant Examiner—Callie E Shosho
(74) Attorney, Agent, or Firm—Ladas & Parry

(57) ABSTRACT

An ink composition is provided which can realize an image having excellent rubbing/scratch resistance and waterfastness, is free from a clogged nozzle problem, and enables stable printing. The ink composition comprises a colorant, a fine particle of a polymer, a water-soluble organic solvent, and water, the fine particle of the polymer having a film-forming property, a carboxyl group on its surface, and a reactivity with a divalent metal salt such that, when three volumes of an aqueous emulsion, of the fine particle of the polymer, having a fine particle concentration of 0.1% by weight is brought into contact with one volume of an aqueous divalent metal salt solution having a concentration of 1 mol/liter, the time for the transmission of light at a wavelength of 700 nm to be decreased to 50% of the initial transmission is not more than $1 \times 10^4$ sec.

25 Claims, No Drawings

INK COMPOSITION FOR INK JET RECORDING

BACKGROUND OF THE INVENTION

1. Field of the Invention

The present invention relates to an ink composition suitable for ink jet recording, and a fine particle of a polymer suitable for the ink composition for ink jet recording.

2. Background Art

Ink jet recording is a printing method wherein droplets of an ink are ejected and deposited onto a recording medium such as paper. The ink for the ink jet recording generally contains a water-soluble dye in water or a combination of water with an organic solvent. It is generally pointed out that an image obtained by the ink containing a water-soluble dye has poor waterfastness and lightfastness.

On the other hand, an ink prepared by dispersing a pigment in an aqueous medium has excellent waterfastness and lightfastness. In an image obtained by the ink containing a pigment as the colorant, however, the colorant is likely to be left near the surface of the recording medium. Therefore, unsatisfactory fixation of the colorant on the surface of the recording medium results in the formation of a print which, when the image is rubbed with, for example, a finger, causes the recording medium to be smeared with the pigment. Furthermore, when printed letters are marked with a highlight pen, this causes the printed image area to be smeared. Therefore, a print having a good touch and rubbing/scratch resistance cannot be provided. Addition of a resin to the ink composition has been proposed in order to improve the fixation of the colorant to the recording medium. This resin is considered to function as a binder to strongly fix the colorant onto the recording medium.

Conventional resin-containing ink compositions include, for example, an ink comprising a pigment and a resin emulsion dispersed in water (Japanese Patent Publication No. 1426/1987), a dispersion of a pigment in a water-insoluble, resin emulsion dispersion (Japanese Patent Laid-Open No. 157668/1980), an ink using an emulsion having a specific film-forming temperature (Japanese Patent Laid-Open No. 217088/1989), and an ink using a resin emulsion (Japanese Patent Laid-Open Nos. 60068/1991 and 18462/1992). Further, Japanese Patent Laid-Open Nos. 147859/1981 and 147860/1981 and Japanese Patent Publication No. 5703/1992 propose an aqueous dispersion type pigment ink using a polymeric dispersant and a water-soluble organic solvent.

Further, use of a core/shell resin particle comprising a core and a shell surrounding the core in an ink for ink jet recording has also been studied in the art. For example, Japanese Patent Laid-Open No. 299234/1991 proposes an ink comprising a fine particle of a polymer having a two-layer structure and having an average particle diameter of not more than 0.1 μm. The particle comprising a core polymer prepared by homopolymerization or copolymerization of a (meth)acrylic ester compound, a vinyl ester compound, a styrene compound, or an olefin compound and a shell polymer comprising a fluoropolymer. Japanese Patent Laid-Open No. 259869/1996 proposes use of an organic fine particle comprising a core of a polymer, having a high degree of crosslinking, such as a styrene/divinylbenzene polymer, and a shell having a surface-modifying property.

Japanese Patent Laid-Open No. 278479/1995 proposes use of a fine particle prepared by polymerization of a monomer containing not less than 5% by weight of a crosslinking monomer having in one molecule two or more groups having a polymerizable double bond and not less than 2% by weight of a hydrophilic monomer having a hydrophilic group.

However, some of the ink compositions containing the above resins have a viscosity rendering the ink composition unsuitable for ink jet recording. In addition, a head for ink jet recording, has a nozzle plate which is treated so as to be rendered water-repellent, permitting ink droplets to be easily ejected through nozzles. Some of the resin-containing ink compositions are likely to attach to the nozzle plate and to well wet the plate. This causes an ink droplet trajectory directionality problem or a failure of the nozzle to eject the ink. Further, due to the water-soluble property of the resin, the printed image has often poor waterfastness. Furthermore, evaporation of water in the ink increases the viscosity of the ink, leading to clogging of nozzles.

In addition, the fine particle of the polymer disclosed in Japanese Patent Laid-Open No. 278479/1995 contains not less than 5% by weight of a crosslinkable monomer, causing a high degree of crosslinking. This makes it impossible to provide a satisfactory film-forming property, resulting in unsatisfactory fixation of a printed image onto the recording medium. Therefore, the printed image has poor rubbing/scratch resistance.

SUMMARY OF THE INVENTION

The present inventors have now found that addition of a fine particle of a polymer having high reactivity with a salt of a divalent metal can provide an ink composition having excellent properties, especially an ink composition which can realize an image having excellent rubbing/scratch resistance and water resistance, is free from a nozzle clogging problem, and enables stable printing. The present invention has been made based on such finding.

Accordingly, an object of the present invention is to provide an ink composition which can realize an image having excellent rubbing/scratch resistance and waterfastness, is free from a clogged nozzle problem, and enables stable printing.

According to one aspect of the present invention, there is provided an ink composition comprising at least a colorant, a fine particle of a polymer, a water-soluble organic solvent, and water, the fine particle of the polymer having a film-forming property, a carboxyl group on its surface, and a reactivity with a divalent metal salt such that, when three volumes of 0.1% by weight of an aqueous emulsion of the fine particle of the polymer is brought into contact with one volume of an aqueous divalent metal salt solution having a concentration of 1 mol/liter, the time for the transmission of light at a wavelength of 700 nm to be decreased to 50% of the initial transmission is not more than $1 \times 10^4$ sec.

DETAILED DESCRIPTION OF THE INVENTION

Ink Composition

The ink composition according to the present invention can be used in recording methods using an ink composition. Recording methods using an ink composition include, for example, an ink jet recording method, a recording method using writing utensils, such as pens, and other various printing methods. In particular, the ink composition according to the present invention is preferably used in the ink jet recording method.

The ink composition according to the present invention comprises at least a colorant, a fine particle of a polymer, a water-soluble organic solvent, and water.

Fine Particle of Polymer

The fine particle of a polymer used in the present invention has a film-forming property and high reactivity with a divalent metal salt.

The term "film-forming property" means that, when a fine particle of a polymer is dispersed in water to prepare an aqueous emulsion and the water component in the aqueous emulsion is then evaporated, a resin film is formed. As with the aqueous emulsion, the ink composition with the fine particle of a polymer added thereto, when the solvent component is evaporated, forms a resin film. The resin film serves to strongly fix the colorant component in the ink composition onto the surface of a recording medium. It is believed that, by virtue of this, an image having excellent rubbing/scratch resistance and waterfastness can be realized.

Furthermore, the fine particle of a polymer used in the present invention has a carboxyl group on its surface and high reactivity with a divalent metal salt. The fine particle of a polymer has a reactivity with a divalent metal salt such that, when three volumes of 0.1% by weight of an aqueous emulsion of the fins particle of the polymer is brought into contact with one volume of an aqueous divalent metal salt solution having a concentration of 1 mol/liter, the time for the transmission of light at a wavelength of 700 nm to be decreased to 50% of the initial transmission is not more than $1 \times 10^4$ sec (preferably not more than $1 \times 10^3$ sec, more preferably not more than $1 \times 10^2$ sec). The fine particle of a polymer used in the present invention, when brought into contact with a divalent metal ion, is reacted with the divalent metal ion to create floating matter which lowers the transparency of the solution. The amount of the floating matter produced is determined in terms of the transmission of light. Divalent metal ions usable herein include $Ca^{2+}$, $Cu^{2+}$, $Ni^{2+}$, $Mg^{2+}$, $Zn^{2+}$, and $Ba^{2+}$. Anions which form salts with the divalent metal ions Include $Cl^-$, $NO_3^-$, $I^-$, $Br^-$, $ClO_3^-$, and $CH_3COO^-$. The high reactivity of the fine particle is believed to derive from the fact that the fine particle of a polymer has on its surface a relatively large amount of carboxyl group. The ink composition containing a fine particle of a highly reactive polymer having on its surface a large amount of carboxyl group does not have affinity for the nozzle plate of the ink jet recording head which has been treated for rendering the plate water-repellent. Therefore, the ink composition of the present invention has a great advantage that an ink droplet trajectory directionality problem or a failure of the nozzle to eject the ink, which has been a problem of the resin-containing ink composition, attributable to well wetting of the nozzle plate by the ink composition can be effectively prevented. According to a preferred embodiment of the present invention, the contact angle of an aqueous emulsion, of the fine particle of a polymer, having a fine particle concentration of 10% by weight dispersed in a water medium on a teflon sheet is not less than 70°. Further, the surface tension of an aqueous emulsion, of the fine particle of a polymer, having a fine particle concentration of 35% by weight dispersed in a water medium is preferably not less than $40 \times 10^{-3}$ N/m (not less than 40 dyne/cm at 20° C.). Use of the fine particle having the above contact angle or the surface tension can more effectively prevent the ink droplet trajectory directionality problem and enables better printing.

The particle diameter of the fine particle is preferably 0.005 to 0.4 µm, more preferably 0.005 to 0.2 µm.

In addition, use of the fine particle having a relatively large amount of carboxyl group can realize better rubbing/scratch resistance and waterfastness. Without intending to be bound by theory, it is believed as follows. When the ink composition according to the present invention is deposited onto the surface of a recording medium such as paper, water and the water-soluble organic solvent in the ink composition first penetrate the recording medium. Then, the colorant and the fine particle of a polymer are left on the surface of the recording medium. At that time, the carboxyl group on the surface of the fine particle combines with a hydroxyl group of cellulose constituting the paper fiber, permitting the fine particle of a polymer and the paper fiber to be strongly adsorbed to each other. This further inhibits penetration of the colorant into the interior of the paper. Water and the water-soluble organic solvent around the fine particle adsorbed to the paper fiber are penetrated into the paper, and, hence, the amount thereof is reduced. Since the fine particle of a polymer has a film-forming property, the reduction in amount of water and the water-soluble organic solvent results in coalescence of fine particles of the polymer into a resin film which, by virtue of the presence of the carboxyl group, is more strongly fixed onto the surface of the recording medium. The mechanism is hypothetical, and the present invention is not limited thereto.

The ink composition of the present invention, by virtue of high hydrophilicity of the fine particle of a polymer in its surface, advantageously has excellent storage stability.

According to a preferred embodiment, the fine particle of a polymer has a minimum film-forming temperature of room temperature or below, more preferably 30° C. or below, most preferably 10° C. or below. This is because the film formation is preferably carried out at a temperature of room temperature or below. The term "minimum film-forming temperature" used herein refers to a minimum temperature at which, when a polymer emulsion prepared by dispersing the fine particle in water is thinly cast onto a sheet of a metal, such as aluminum, to form a coating which is then gradually heated, forms a transparent, continuous film. At the temperature below the minimum film-forming temperature, a white powder is formed. According to a preferred embodiment of the present invention, the fine particle has a glass transition point of 30° C. or below.

According to a preferred embodiment of the present invention, the fine particle comprises 1 to 10% by weight of a structure derived from an unsaturated vinyl monomer having a carboxyl group and 0.2 to 4% by weight of a crosslinkable monomer-derived structure crosslinked by a crosslinkable monomer having two or more polymerizable double bonds. Use of a three-dimensionally-crosslinked polymer prepared by copolymerizing a crosslinkable monomer compound having preferably two or more, more preferably three or more polymerizable double bonds permits the wettability of the surface of the nozzle plate by the ink composition to be further reduced. This enables the ink droplet trajectory directionality problem to be more fully solved and the ink to be more stably ejected.

According to the present invention, the fine particle of a polymer may have either a single particle structure or a core/shell structure comprising a core and shell surrounding the core. The term "core/shell structure" used herein refers to "such a form that two or more polymers having different compositions are present as separate phases in a particle. Therefore, the core may be entirely or partially covered with the shell. Further, a part of the polymer constituting the shell may form a domain within the core particle. Furthermore, the fine particle of a polymer may have a structure of three or more layers comprising one or more additional layers, having a composition different from the core and shell, provided between the core and the shell.

According to a preferred embodiment of the present invention, the core comprises a resin having an epoxy group, while the shell comprises a resin having a carboxyl group. The epoxy group and the carboxyl group are reactive with each other. In this preferred embodiment, these two groups are allowed to separately exist respectively in the core and the shell. A reduction in the amount of water and the water-soluble organic solvent develops coalescence of fine particles of the polymer with one another, and deformation occurs due to pressure created by the film formation. This causes the epoxy group of the core to be bonded to the carboxyl group of the shell to form a network structure. This offers an advantage that a film having larger strength can be formed. The amount of the unsaturated vinyl monomer having an epoxy group is preferably 1 to 10% by weight. It should be noted that, in the present invention, a reaction of a part of the epoxy group with a part of the carboxyl group before the film formation is acceptable so far as the film forming property is not lost. The property, wherein, in the film formation, reactive functional groups present within the fine particle are reacted with each other without adding any curing agent to form a network structure, is called "self-crosslinkable."

The fine particle of a polymer used in the present invention may be prepared by conventional emulsion polymerization. Thus, it may be prepared by emulsion polymerization of an unsaturated vinyl monomer (an unsaturated vinyl monomer) in water in the presence of a polymerization catalyst and an emulsifier.

Unsaturated vinyl monomers usable herein include those commonly used in emulsification polymerization, such as acrylic ester monomers, methacrylic ester monomers, aromatic vinyl monomers, vinyl ester monomers, vinyl cyanide monomers, halogenated monomers, olefin monomers, and diene monomers. Specific examples thereof include: acrylic esters, such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanide compounds, such as acrylonitrile and methacrylonitrile; halogenated monomers, such as vinylidene chloride and vinyl chloride; aromatic vinyl monomers, such as styrene, 2-methylstyrene, vinyltoluene, t-butylstyrene, chlorostyrene, vinylanisole, and vinylnaphthalene; olefins, such as ethylene, propylene, and isopropylene; dienes, such as butadiene and chloroprene; and vinyl monomers, such as vinyl ether, vinyl ketone, and vinylpyrrolidone. Utilization of an unsaturated vinyl monomer having a carboxyl group is indispensable for monomers not having any carboxyl group. Preferred examples thereof include acrylic acid, methacrylic acid, itaconic acid, fumaric acid, and maleic acid. Among them, methacrylic acid is preferred. Emulsifiers usable herein include anionic surfactants, nonionic surfactants, and a mixture thereof.

In the present invention, preferably, the structure prepared by crosslinking molecules derived from the above monomer with a crosslinkable monomer having two or more polymerizable double bonds is preferred. Examples of crosslinkable monomers having two or more polymerizable double bonds include: diacrylate compounds, such as polyethylene glycol diacrylate, triethylene glycol diacrylate, 1,3-butylene glycol diacrylate, 1,6-butylene glycol diacrylate, 1,6-hexane diol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds, such as trimethylolpropane triacrylate, trimethylolethane triacrylate, and tetramethylolmethane triacrylate; tetraacrylate compounds, such as ditrimethyloltetraacrylate, tetramethylolmethane tetraacrylate, and pentaerythritol tetraacrylate; hexaacrylate compounds, such as dipentaerythritol hexaacrylate; dimethacrylate compounds, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds, such as trimethylolpropane trimethacrylate and trimethylolethane trimethacrylate; and methylenebisacrylamide; and divinylbenzene.

Addition of an acrylamide compound or a hydroxyl-containing monomer in addition to the above monomer results in further improved printing stability. Examples of acrylamides usable herein include acrylamide and N,N'-dimethylacrylamide. Examples of hydroxyl-containing monomers usable herein include 2-hydroxyethyl acrylate, 2-hydroxypropyl acrylate, 2-hydroxyethyl methacrylate, and 2-hydroxypropyl methacrylate. They may be used alone or as a mixture of two or more.

The fine particle of a polymer having a core/shell structure may be produced by a conventional method, generally multistage emulsion polymerization and the like. For example, the fine particle of a polymer having a core/shell structure may be produced by a method disclosed in Japanese Patent Laid-Open No. 76004/1992. Examples of unsaturated vinyl monomers usable in the polymerization include those described above.

Methods for introducing the epoxy group into the core include one wherein an unsaturated vinyl monomer having an epoxy group, such as glycidyl acrylate, glycidyl methacrylate, or allyl glycidyl ether, is copolymerized with other unsaturated vinyl monomer(s) and one wherein, in the preparation of the core particle by polymerization of at least one unsaturated vinyl monomer, an epoxy compound is simultaneously added to form a composite structure. The former method is preferred from the viewpoints of easiness in polymerization, polymerization stability and the like.

Initiators, surfactants, molecular weight modifiers, neutralizers and the like commonly used in the emulsification polymerization may also be used.

In the present invention, the fine particle of a polymer may be mixed, as a powder of fine particles, with other ingredients of the ink composition. Preferably, the fine particle of a polymer is dispersed in a water medium to prepare a polymer emulsion which is then mixed with other ingredients of the ink composition. The content of the fine particle of a polymer in the ink composition is preferably about 1 to 10% by weight, more preferably about 1 to 5% by weight.

According to another aspect of the present invention, a fine particle of a polymer and a polymer emulsion comprising the fine particle of a polymer dispersed in water for use in an ink composition for ink jet recording are provided. Utilization of the fine particle of a polymer and the polymer emulsion can provide an ink composition having good properties suitable for ink jet recording.

Colorant

The colorant contained in the ink composition according to the present invention may be either a dye or a pigment. However, a pigment is preferred from the viewpoint of lightfastness and waterfastness. It is also possible to use a pigment and a dye in combination.

Both inorganic and organic pigments are usable without any particular limitation. Examples of inorganic pigments usable herein include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chalate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

Carbon blacks usable for black inks include: No. 2300, No. 900, MCF 88, No. 33, No. 40, No. 45, No. 52, MA7, MA8, MA100, No. 2200B and the like, manufactured by Mitsubishi Chemical Corporation; Raven 5750, Raven 5250, Raven 5000, Raven 3500, Raven 1255, Raven 700 and the like, manufactured by Columbian Carbon Co., Ltd.; Regal 400R, Regal 330R, Rega 1660R, Mogul L, Monarch 700, Monarch 800, Monarch 880, Monarch 900, Monarch 1000, Monarch 1100, Monarch 1300, Monarch 1400 and the like, manufactured by Cabot Corporation: and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, manufactured by Degussa. Pigments usable for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151, and C.I. Pigment Yellow 154. Pigments usable for magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 123, C.I. Pigment Red 168, C.I. Pigment Red 184, and C.I. Pigment Red 202. Pigments usable for cyan inks include C.I. Pigment Blue 1, C.I. Pigment Blue 2, C.I. Pigment Blue 3, C.I. Pigment Blue 15:3, C.I. Pigment Blue 15:34, C.I. Pigment Blue 16, C.I. Pigment Blue 22, C.I. Pigment Blue 60, C. I. Vat Blue 4, and C.I. Vat Blue 60.

The particle diameter of the pigment is preferably not more than 10 µm, more preferably not more than 0.1 µm.

Dyes usable herein include various dyes commonly used in ink jet recording, such as direct dyes, acid dyes, foodstuff dyes, basic dyes, reactive dyes, disperse dyes, vat dyes, soluble vat dyes, and reactive disperse dyes.

Preferably, the above pigment is added, to the ink, in the form of a pigment dispersion prepared by dispersing the pigment in an aqueous medium with the aid of a dispersant. Preferred dispersants include those commonly used in the preparation of a dispersion of a pigment, for example, a polymeric dispersant or a surfactant. In this connection, that the surfactant contained in the dispersion of the pigment function also as the surfactant for an ink composition described below will be apparent to a person having ordinary skill in the art. Specific examples of polymeric dispersants usable herein include naturally occurring polymers, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methyl cellulose, carboxymethyl cellulose, hydroxyethyl cellulose, and ethylhydroxy cellulose. Examples of preferred polymeric dispersants usable herein include synthetic polymers include polyvinyl alcohols, polyvinyl pyrrolidones, acrylic resins, such as polyacrylic acid, acrylic acid/acrylonitrile copolymer, potassium acrylatelacrylonitrile copolymer, vinyl acetate/acrylic ester copolymer, and acrylic acid/acrylic ester copolymer, styrenelacrylic resins, such as styrene/acrylic acid copolymer, styrone/methacrylic acid copolymer, styrene/methacrylic acid/acrylic ester copolymer, styrene/α-methylstyrene/acrylic acid copolymer, and styrene/α-methylstyrene/acrylic acid/acrylic ester copolymer, styrene/maleic acid copolymer, styrene/maleic anhydride copolymer, vinylnaphthalene/acrylic acid copolymer, vinylnaphthalene/maleic acid copolymer, and vinyl acetate copolymers, such as vinyl acetate/ethylene copolymer, vinyl acetate/fatty acid/ethylene copolymer, vinyl acetate/maleic ester copolymer, vinyl acetate/crotonic acid copolymer, and vinyl acetate/acrylic acid copolymer, and salts of the above polymers. Among them, a copolymer of a monomer having a hydrophobic group with a monomer having a hydrophilic group and a polymer of a monomer having both a hydrophobic group and a hydrophilic group in its molecular structure are particularly preferred.

The content of the pigment in the ink composition according to the present invention is preferably about 0.5 to 25% by weight, more preferably about 2 to 15% by weight.

Water, Water-soluble Organic Solvent, and Other Ingredients

The solvent for the ink composition of the present invention is water and a water-soluble organic solvent.

According to a preferred embodiment of the ink composition of the present invention, utilization of a water-soluble organic solvent having a boiling point of 180° C. or above is preferred. The water-soluble organic solvent having a boiling point of 180° C. or above can impart water retention and wetting properties to the ink composition. As a result, the ink composition, even when stored for a long period of time, does not cause agglomeration of the colorant and an increase in viscosity and can realize excellent storage stability. Further, the ink composition, even when allowed to stand in an open state (that is, a state of contact with air at room temperature), can maintain the fluidity and the redispersibility for a long period of time. Furthermore, the ink composition does not cause clogging of nozzles during printing or at the time of restarting after interruption of printing, thus offering high ejection stability.

Examples of water-soluble organic solvents having a boiling point of 180° C. or above usable in the present invention include ethylene glycol (b.p.: 197° C.; the boiling point being hereinafter described within the parentheses), propylene glycol (187° C.), diethylene glycol (245° C.). pentamethylene glycol (242° C.), trimethylene glycol (214° C.), 2-butene-1,4-diol (235° C.), 2-athyl-1,3-hexanediol (243° C.), 2-methyl-2,4-pentanediol (197° C.), N-methyl-2-pyrrolidone (202° C.), 1,3-dimethyl-2-imidazolldinone (257–260° C.), 2-pyrrolidone (245° C.), glycerin (290° C.), tripropylene glycol monomethyl ether (243° C.), dipropylen glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), diethylene glycol monobutyl ether (230° C.), diethylene glycol monoethyl ether (202° C.), and diethylene glycol monomethyl ether (194° C.). Among them, the organic solvents having a boiling point of 200° C. or above are preferred. These organic solvents may be used alone or as a mixture of two or more.

The content of the water-soluble organic solvent is preferably about 10 to 40% by weight, more preferably 10 to 20% by weight.

According to a preferred embodiment of the present invention, the ink composition of the present invention may contain a saccharide, a tertiary amine, or an alkali hydroxide. Addition of the saccharide and the tertiary amine can impart wetting properties. On the other hand, addition of the tertiary amine and the alkali hydroxide can offer dispersion stability of the colorant and the fine particle of the polymer in the ink composition.

Examples of saccharides usable herein include monosaccharidea, disaccharides, oligosaccharides (including trisaccharides and tetrasaccharides), and polyzaccharides, and preferred examples thereof include glucose, mannose, fructose, ribose, xylose, arabinose, galactose, aldonic acid, glucitol, sorbitol, maltose, cellobiose, lactose, sucrose, trehalose, and maltotriose. The polysaccharides refer to saccharides in a wide sense and embrace materials which widely exist in the natural world, such as alginic acid, α-cyclodextrin, and cellulose. Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbitol. The amount of the saccharide added is preferably about 0.1 to 40% by weight, more preferably about 1 to 30% by weight.

Examples of tertiary amines usable herein include trimethylamina, triethylamine, triethanolamine, dimethylethanolamine, diethylethanolamine, triisopropenolamim, and butyldiethanolamine. They may be used alone or as a mixture of two or more. The amount of the tertiary amine added to the ink composition is preferably about 0.1 to 10% by weight, more preferably 0.5 to 5% by weight.

Examples alkali hydroxides usable herein include potassium hydroxide, sodium hydroxide, and lithium hydroxide, and the amount of the alkali hydroxide added is preferably about 0.01 to 5% by weight, more preferably about 0.05 to 3% by weight.

The ink composition according to the present invention may further comprise a surfactant. Examples of surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl easters, polyoxyathylene sorbitan fatty acid esters, polyoxyethylene alkylphenyl ethers, polyoxyethylenealkylamines, and polyoxyethylenealkylamides), and acetylene glycol. They may be used alone or in combination of two or more.

If necessary, pH adjusters, preservatives, and antimolds and the like may be added to the ink composition from the viewpoint of improving the storage stability.

EXAMPLES

The following examples illustrate the present invention but are not intended to limit it.

Preparation of Aqueous Emulsion Containing Fine Particle of Polymer as Dispersed Particle An aqueous emulsion containing a fine particle of a polymer as a dispersed particle was prepared by the following method. Furthermore, properties of the aqueous emulsion were measured by the following method.

Minimum Film-forming Temperature

The minimum film-forming temperature was measured with a minimum film-forming temperature measuring apparatus. After the temperature gradient of the top surface of a sample plate made of aluminum reached equilibrium, an aqueous emulsion was thinly spread on the sample plate and dried. After the completion of drying, a transparent, continuous film was formed in a temperature region above the minimum film-forming temperature, while a white powder was formed in a temperature region below the minimum film-forming temperature. The temperature of the boundary between the temperature at which the transparent, continuous film was formed and the temperature at which the white powder was formed was decided as the minimum film-forming temperature.

Contact Angle

The contact angle was measured at 25° C. with a contact angle measuring apparatus. One drop of an aqueous emulsion, of the fine particle of a polymer, having a concentration of 10% by weight was dropped on a smooth teflon sheet. The contact angle between the aqueous emulsion and the teflon sheet was measured by reading the angle under a microscope.

Surface Tension

An aqueous emulsion having a solid content of 35% by weight was prepared, and the surface tension of the aqueous emulsion was measured at 25° C. with a fully automatic balance type electronic surface tension balance (Digiomatic ESB-IV, nanufactured by Kyowa Scientific Co., Ltd.).

Half Value Period in Reaction with Divalent Metal Ion

An aqueous emulsion (3 ml) having a concentration of a fine particle of a polymer of 0.1% by weight was placed in a cell for a spectrophotometer with caution so as to avoid the inclusion of air bubble. The cell was set in a sample chamber of the spectrophotometer. As soon as 1 ml of a 1 mol/l aqueous magnesium chloride solution was dropwise added to the cell, a change in transmission at a wavelength of 700 nm with the elapse of time was measured to determine the time taken for the transmission to be decreased to 50% of the initial transmission.

Preparation 1

Ion-exchanged water (900 g) and 4 g of sodium laurylsulfate were charged into a reactor equipped with an agitator, a reflux condenser, a dropping device, and a thermometer, and the temperature was raised to 70° C. while purging with nitrogen under agitation. The internal temperature was maintained at 70° C., and 2 g of potassium persulfate was added as a polymerization initiator and dissolved in the solution. Thereafter, an emulsion previously prepared by adding 435 g of styrene, 475 g of butyl acrylate, and 30 g of methacrylic acid to 450 g of ion-exchanged water, 3 g of sodium laurylsulfate, and 20 g of acrylamide with stirring was continuously added dropwise to the reaction solution over a period of 3 hr. After the addition of the emulsion was completed, the mixture was permitted to stand out for 3 hr.

The aqueous emulsion thus prepared was cooled to room temperature. Then, ion-exchanged water and aqueous ammonia were added to regulate the emulsion to a solid content of 40% by weight and pH 8.

The resultant aqueous emulsion had a minimum film-forming temperature of 22° C., a surface tension of $57 \times 10^{-3}$ N/m (57 dyne/cm), a contact angle of 89°, an average particle diameter of 0.09 μm, and a half value period of 70 sec in a reaction with an $Mg^{2+}$ ion.

Preparation 2

Ion-exchanged water (900 g) and 4 g of sodium laurylsulfate were charged into a reactor equipped with an agitator, a reflux condenser, a dropping device, and a thermometer, and the temperature was raised to 70° C. while purging with nitrogen under agitation. The internal temperature was maintained at 70° C., and 2 g of potassium persulfate was added as a polymerization initiator and dissolved in the solution. Thereafter, an emulsion previously prepared by adding 435 g of styrene, 475 g of butyl acrylate, 30 g of methacrylic acid, and 2 g of ethylene glycol dimethacrylate to 450 g of ion-exchanged water, 3 g of sodium laurylsulfate, and 20 g of acrylamide, with stirring was continuously added dropwise to the reaction solution over a period of 3 hr. After the addition of the emulsion was completed, the mixture was permitted to stand for 3 hr.

The aqueous emulsion thus prepared was cooled to room temperature. Then, ion-exchanged water and aqueous ammonia were added to regulate the emulsion to a solid content of 40% by weight and pH 8.

The resultant aqueous emulsion had a minimum film-forming temperature of 22° C., a surface tension of $59 \times 10^{-3}$ N/m (59 dyne/cm), a contact angle of 113°, an average particle diameter of 0.08 μm, and a half value period of 5 sec in a reaction with an $Mg^{2+}$ ion.

Preparation 3

Ion-exchanged water (900 g) was charged into a reactor equipped with an agitator, a reflux condenser, a dropping device, and a thermometer, and the temperature was raised to 70° C. while purging with nitrogen under agitation. The internal temperature was maintained at 70° C., and 2 g of potassium persulfate was added as a polymerization initiator and dissolved in the solution. Thereafter, an emulsion previously prepared by adding 53 g of styrene, 59 g of butyl acrylate, 48 g of glycidyl methacrylate, and 0.16 g of t-dodecylmercaptan as a molecular weight modifier to 70 g of ion-exchanged water and 1.0 g of sodium laurylsulfate with stirring was continuously added dropwise to the reactor over a period of 1 hr. After the addition of the emulsion was completed, the mixture was permitted to stand for one hr.

An emulsion previously prepared by adding 79 g of styrene, 80 g of butyl acrylate, and 0.16 g of t-dodecylmercaptan to 70 g of ion-exchanged water, 1.0 g of sodium laurylsulfate, and 1 g of acrylamide with stirring was continuously added dropwise to the reactor over a period of one hr. After the addition of the emulsion was completed, the mixture was permitted to stand for one hr.

A solution 2 g of ammonium persulfate as a polymerization initiator in 20 g of ion-exchanged water was then added to the reactor, and an emulsion previously prepared by adding 298 g of styrene, 297 g of butyl acrylate, 29 g of methacrylic acid, and 0.65 g of t-dodecylmercaptan to 300 g of ion-exchanged water, 2 g of sodium laurylsulfate, and 16 g of acrylamide with stirring was continuously added dropwise to the reactor over a period of three hr. After the addition of the emulsion was completed, the mixture was permitted to stand for 3 hr.

The aqueous emulsion thus prepared was cooled to room temperature. Then, ion-exchanged water and aqueous ammonia were added to regulate the emulsion to a solid content of 40% by weight and pH 8.

The resultant aqueous emulsion was such that the fine particle of the polymer had a core/shell structure. The minimum film-forming temperature was 24° C., the surface tension was $57 \times 10^{-3}$ N/m (58 dyne/cm), the contact angle was 90°, the average particle diameter was 0.09 μm, and the half value period was 80 sec in a reaction with an $Mg^{2+}$ ion.

Preparation 4

Ion-exchanged water (900 g) was charged into a reactor equipped with an agitator, a reflux condenser, a dropping device, and a thermometer, and the temperature was raised to 70° C. while purging with nitrogen under agitation. The internal temperature was maintained at 70° C., and 2 g of potassium persulfate was added as a polymerization initiator and dissolved in the solution. Thereafter, an emulsion previously prepared by adding 53 g of styrene, 59 g of butyl acrylate, 48 g of glycidyl methacrylate, and 0.16 g t-dodecylmercaptan as a molecular weight modifier to 70 g of ion-exchanged water and 1.0 g of sodium laurylsulfate with stirring was continuously added dropwise to the reactor over a period of 1 hr. After the addition of the emulsion was completed, the mixture was permitted to stand for one hr.

An emulsion previously prepared by adding 79 g of styrene, 80 g of butyl acrylate, and 0.16 g of t-dodecylmercaptan to 70 g of ion-exchanged water, 1.0 g of sodium laurylsulfate, and 1 g of acrylamide with stirring was continuously added dropwise to the reactor over a period of one hr. After the addition of the emulsion was completed, the mixture was permitted to stand for one hr.

A solution 2 g of ammonium persulfate as a polymerization initiator in 20 g of ion-exchanged water was then added to the reactor, and an emulsion previously prepared by adding 298 g of styrene, 297 g of butyl acrylate, 29 g of methacrylic acid, 10 g of ethylene glycol dimethacrylate, and 0.65 g of t-dodecylmercaptan to 300 g of ion-exchanged water, 2 g of sodium laurylsulfate, and 16 g of acrylamide with stirring was continuously added dropwise to the reactor over a period of three hr. After the addition of the emulsion was completed, the mixture was permitted to stand for 3 hr.

The aqueous emulsion thus prepared was cooled to room temperature. Then, ion-exchanged water and aqueous ammonia were added to regulate the emulsion to a solid content of 40% by weight and pH 8.

The resultant aqueous emulsion was such that the fine particle of the polymer has a core/sheet structure. The minimum film-forming temperature was 24° C., the surface tension was $58 \times 10^{-3}$ N/m (58 dyne/m), the contact angle was 108°, the average particle diameter was 0.09 μm, and the half value period was 10 sec in a reaction with an $Mg^{2+}$ ion.

Preparation 5

Ion-exchanged water (900 g) was charged into a reactor equipped with an agitator, a reflux condenser, a dropping device, and a thermometer, and the temperature was raised to 70° C. while purging with nitrogen under agitation. The internal temperature was maintained at 70° C., and 2 g of potassium persulfate was added as a polymerization initiator and dissolved in the solution. Thereafter, an emulsion previously prepared by adding 53 g of styrene, 59 g of butyl acrylate, 48 g of glycidyl methacrylate, and 0.16 g t-dodecylmercaptan as a molecular weight modifier to 70 g of ion-exchanged water and 0.5 g of sodium laurylsulfate with stirring was continuously added dropwise to the reactor over a period of 1 hr. After the addition of the emulsion was completed, the mixture was permitted to stand for one hr.

An emulsion previously prepared by adding 79 g of styrene, 80 g of butyl acrylate, and 0.16 g of t-dodecylmercaptan to 70 g of ion-exchanged water, 0.5 g of sodium laurylsulfate, and 1 g of acrylamide with stirring was continuously added dropwise to the reactor over a period of one hr. After the addition of the emulsion was completed, the mixture was permitted to stand for one hr.

A solution 2 g of ammonium persulfate as a polymerization initiator in 20 g of ion-exchanged water was then added to the reactor, and an emulsion previously prepared by adding 298 g of atyrene, 297 g of butyl acrylate, 29 g of methacrylic acid, 10 g of ethylene glycol dimethacrylate, and 0.65 g of t-dodecylmercaptan to 300 g of ion-exchanged water, 2 g of sodium laurylsulfate, and 16 g of acrylamide with stirring was continuously added dropwise to the reactor over a period of three hr. After the addition of the emulsion was completed, the mixture was permitted to stand for 3 hr.

The aqueous emulsion thus prepared was cooled to room temperature. Then, ion-exchanged water and aqueous ammonia were added to regulate the emulsion to a solid content of 40% by weight and pH 8.

The resultant aqueous emulsion was such that the fine particle of the polymer had a core/shell structure. The minimum film-forming temperature was 24° C., the surface tension was $55 \times 10^{-3}$ N/m (55 dyne/cm), the contact angle was 92°, the average particle diameter was 0.18 μm, and the half value period was 3620 sec in a reaction with an $Mg^{2+}$ ion.

Preparation of Ink Composition

Example 1

| | |
|---|---|
| Carbon black MA7 (manufactured by Mitsubishi Chemical Corp.) | 5 wt % |
| Styrene/acrylic acid copolymer (dispersant) | 1 wt % |
| Aqueous emulsion of Preparation 1 (in terms of concentration of fine particle of polymer) | 3 wt % |
| Glycerin | 15 wt % |
| Potassium hydroxide | 0.1 wt % |
| Pure water | Balance |

An ink was prepared as follows. Carbon black, the dispersant, and water were mixed together and dispersed by means of a sand mill (manufactured by Yasukawa Seisakusho) with glass beads (diameter: 1.7 mm, amount: 1.5 times, by weight, the amount of the mixture) for 2 hr. Thereafter, the glass beads were removed to prepare a carbon black dispersion. The aqueous emulsion (3% by weight in terms of fine particle of polymer) containing a fine particle of a polymer as a dispersed particle prepared in Preparation 1 and other ingredients were added to the dispersion. The mixture was then stirred at room temperature for 20 min. Thereafter, the dispersant for carbon black was gradually added dropwise to the mixture with stirring, followed by stirring for additional 20 min. The mixture was then filtered through a 5-μm membrane filter to prepare an ink for ink jet recording.

The following ink compositions were prepared according to Example 1.

Example 2

| | |
|---|---|
| Carbon black MA7 (manufactured by Mitsubishi Chemical Corp.) | 5 wt % |
| Styrene/acrylic acid copolymer (dispersant) | 1 wt % |
| Aqueous emulsion of Preparation 1 (in terms of concentration of fine particle of polymer) | 3 wt % |
| Glycerin | 15 wt % |
| Maltitol | 7 wt % |
| Potassium hydroxide | 0.1 wt % |
| Pure water | Balance |

Example 3

| | |
|---|---|
| Carbon black MA7 (manufactured by Mitsubishi Chemical Corp.) | 5 wt % |
| Styrene/acrylic acid copolymer (dispersant) | 1 wt % |
| Aqueous emulsion of Preparation 2 (in terms of concentration of fine particle of polymer) | 3 wt % |
| Glycerin | 15 wt % |
| Potassium hydroxide | 0.1 wt % |
| Pure water | Balance |

Example 4

| | |
|---|---|
| Carbon black MA7 (manufactured by Mitsubishi Chemical Corp.) | 5 wt % |
| Styrene/acrylic acid copolymer (dispersant) | 1 wt % |
| Aqueous emulsion of Preparation 2 (in terms of concentration of fine particle of polymer) | 3 wt % |
| Glycerin | 15 wt % |
| Maltitol | 7 wt % |
| Potassium hydroxide | 0.1 wt % |
| Pure water | Balance |

Example 5

| | |
|---|---|
| Carbon black MA7 (manufactured by Mitsubishi Chemical Corp.) | 5 wt % |
| Styrene/acrylic acid copolymer (dispersant) | 1 wt % |
| Aqueous emulsion of Preparation 3 (in terms of concentration of fine particle of polymer) | 3 wt % |
| Glycerin | 15 wt % |
| Potassium hydroxide | 0.1 wt % |
| Pure water | Balance |

Example 6

| | |
|---|---|
| Carbon black MA7 (manufactured by Mitsubishi Chemical Corp.) | 5 wt % |

-continued

| | |
|---|---|
| Styrene/acrylic acid copolymer (dispersant) | 1 wt % |
| Aqueous emulsion of Preparation 3 (in terms of concentration of fine particle of polymer) | 3 wt % |
| Glycerin | 15 wt % |
| Potassium hydroxide | 0.1 wt % |
| Pure water | Balance |

Example 7

| | |
|---|---|
| Carbon black MA7 (manufactured by Mitsubishi Chemical Corp.) | 5 wt % |
| Styrene/acrylic acid copolymer (dispersant) | 1 wt % |
| Aqueous emulsion of Preparation 4 (in terms of concentration of fine particle of polymer) | 3 wt % |
| Glycerin | 15 wt % |
| Potassium hydroxide | 0.1 wt % |
| Pure water | Balance |

Example 8

| | |
|---|---|
| Carbon black MA7 (manufactured by Mitsubishi Chemical Corp.) | 5 wt % |
| Styrene/acrylic acid copolymer (dispersant) | 1 wt % |
| Aqueous emulsion of Preparation 4 (in terms of concentration of fine particle of polymer) | 3 wt % |
| Glycerin | 15 wt % |
| Maltitol | 7 wt % |
| Potassium hydroxide | 0.1 wt % |
| Pure water | Balance |

Example 9

| | |
|---|---|
| Carbon black MA7 (manufactured by Mitsubishi Chemical Corp.) | 5 wt % |
| Styrene/acrylic acid copolymer (dispersant) | 1 wt % |
| Aqueous emulsion of Preparation 5 (in terms of concentration of fine particle of polymer) | 3 wt % |
| Glycerin | 15 wt % |
| Potassium hydroxide | 0.1 wt % |
| Pure water | Balance |

Example 10

| | |
|---|---|
| Carbon black MA7 (manufactured by Mitsubishi Chemical Corp.) | 5 wt % |
| Styrene/acrylic acid copolymer (dispersant) | 1 wt % |
| Aqueous emulsion of Preparation 5 (in terms of concentration of fine particle of polymer) | 3 wt % |
| Glycerin | 15 wt % |

-continued

| | |
|---|---|
| Maltitol | 7 wt % |
| Potassium hydroxide | 0.1 wt % |
| Pure water | Balance |

Comparative Example 1

| | |
|---|---|
| Carbon black Raven 1080 (manufactured by Columbian Carbon) | 5 wt % |
| Styrene/acrylic acid copolymer (dispersant) | 1 wt % |
| Glycerin | 10 wt % |
| 2-Pyrrolidone | 2 wt % |
| Pure water | Balance |

An ink was prepared as follows. Carbon black, the dispereant, and water were mixed together and dispersed by means of a sand mill (manufactured by Yasukawa Seisakusho) with glass beads (diameter: 1.7 mm, amount: 1.5 times, by weight, the amount of the mixture) for 2 hr. Thereafter, the glass beads were removed to prepare a carbon black dispersion. Water, glycerin, and 2-pyrrolidone were added to the dispersion, and the mixture was stirred at room temperature for 20 min. Thereafter, the dispersant for carbon black was gradually added dropwise to the mixture with stirring, followed by stirring for additional 20 min. The mixture was then filtered through a 5-$\mu$m membrane filter to prepare an ink for ink jet recording.

Evaluation Tests for Ink Composition

The following ink evaluation tests for the ink compositions prepared above were carried. Letters were printed with an ink jet printer MJ-700V2C (manufactured by Seiko Epson Corporation) under conditions of an amount of the ink ejected per dot of 0.07 $\mu$g and a density of 360 dpi. Papers used for the tests were (1) Xerox P Paper (Xerox Corp.), (2) Ricopy 6200 Paper (Ricoh Co. Ltd.), (3) Xerox 4024 Paper (Xerox Corp.), (4) Neenah Bond Paper (Kimberly-Clark), (5) Xerox R Paper (Xerox Corp., recycled paper), and (6) Yamayuri (Honshu Paper Co., Ltd., recycled paper).

Evaluation 1: Rubbing (scratch) Resistance (line marking resistance)

The print was air dried for 24 hr, and the printed letters were rubbed with a water-bass yellow fluorescent highlight pan (ZEBRA PEN 2 (trademark)) manufactured by ZEBRA at a marking force of 4.9×10$^5$ N/m$^2$, and the degree of stain in the yellow area was observed results were evaluated according to the following criteria.

A: No stain created by rubbing twice,

B: No stain created by rubbing once, but songs paper was stained by rubbing twice, and C: Some paper stained by rubbing once.

Evaluation 2: Print Quality (feathering)

The print after drying was visually inspected for feathering of the letters. The results were evaluated according to the following criteria.

A: Some papers suffering from slight feathering with a sharp printed being offered for the other papers B: Creation of feathering for all the papers C: Remarkable feathering to render the outline of the letter blurry Evaluation 3: Waterfastness A water droplet was dropped on the printed area of the print, and the state of the print was visually inspected. The results were evaluated according to the following criteria.
- A: No change in printed area with water droplet dropped thereon
- B: Creation of mark (water mark) around printed area with water droplet dropped thereon
- C: Blurring around printed area with water droplet dropped thereon Evaluation 4: Ejection Stability Alphabetical letters were continuously printed at room temperature, and dropouts and scattering of the ink were inspected. The time taken for dropouts and scattering of the ink to occur ten times in total was measured. The results were evaluated according to the following criteria.
- A: Not less then 48 hr
- B: 24 to less than 48 hr
- C: 1 to less then 24 hr Evaluation 5: Storage Stability The ink (50 cc) was placed in a glass bottle, and the bottle was hermetically sealed and allowed to stand at 60° C., for two weeks. At the and of the period, the ink was inspected for a change in viscosity and creation of sediment. The results ware evaluated according to the following criteria.
- A: Neither creation of sediment nor change in viscosity
- B: Creation of no sediment with the viscosity being slightly increased (leas than 1.0 cps)
- C: Creation of no sediment with the viscosity being changed
- D: Creation of sediment Evaluation 6: Clogging Alphanumeric characters were continuously printed for 10 min. The printer was then stopped and allowed to stand without capping under an environment of temperature 40° C. and humidity 25% for one week. Thereafter, alphanumeric characters were printed again to determine the number of cleaning operations necessary for offering the same print quality as that before the standing. The results were evaluated according to the following criteria.
- A: 0 to twice
- B: 3 to 5 times
- C: Not less than 6 times The results of evaluation are summarized in the following table.

TABLE 1

| Example | Evaluation | | | | | |
|---|---|---|---|---|---|---|
| | 1 | 2 | 3 | 4 | 5 | 6 |
| 1 | A | A | A | A | A | A |
| 2 | A | A | A | A | A | A |
| 3 | A | A | A | A | A | A |
| 4 | A | A | A | A | A | A |
| 5 | A | A | A | A | A | A |
| 6 | A | A | A | A | A | A |
| 7 | A | A | A | A | A | A |
| 8 | A | A | A | A | A | A |
| 9 | A | A | A | A | A | A |
| 10 | A | A | A | A | A | A |
| Comparative Example 1 | C | C | C | C | D | C |

What is claimed is:

1. An ink composition comprising a colorant, a fine particle of a polymer, a water-soluble organic solvent, and water, the fine particle of the polymer having a film-forming property, a carboxyl group on its surface, and a reactivity with a divalent metal salt such that, when three volumes of an aqueous emulsion, of the fine particle of the polymer, having a fine particle concentration of 0.1% by weight is brought into contact with one volume of an aqueous divalent metal salt solution having a concentration of 1 mol/liter, the time for the transmission of light at a wavelength of 700 nm to be decreased to 50% of the initial transmission is not more than $1 \times 10^4$ sec, the fine particle of the polymer comprising 1 to 10% by weight of a structure derived from an unsaturated vinyl monomer having a carboxyl group and 0.2 to 4% by weight of a crosslinkable monomer-derived structure crosslinked by a crosslinkable monomer having two or more polymerizable double bonds, wherein an aqueous emulsion obtained by dispersing the fine particle of the polymer in water and having fine particle concentration of 10% by weight has a contact angle on a teflon sheet of not less than 70°.

2. The ink composition according to claim 1, wherein the fine particle of the polymer has a core/shell structure comprising a core and a shell.

3. The ink composition according to claim 2, wherein the fine particle of the polymer is self-crosslinkable.

4. The ink composition according to claim 3, wherein the core comprises a resin having an epoxy group with the shell comprising a resin having a carboxyl group.

5. The ink composition according to claim 1, wherein the fine particle of the polymer has a minimum film-forming temperature of 30° C. or below.

6. The ink composition according to claim 1, wherein the water-soluble organic solvent has a boiling point of 180° C. or above.

7. A recording method comprising the step of depositing an rink composition onto a recording medium to conduct printing on the recording medium, wherein the ink composition is one according to any claim 1.

8. A record produced by the recording method according to claim 7.

9. An ink jet recording method comprising the steps of: ejecting droplets of an ink composition; and depositing the droplets onto a recording medium to conduct printing on the recording medium, wherein the ink composition is one according to claim 1.

10. A fine particle of a polymer for use in an ink composition for ink jet recording, said fine particle of a polymer having a film-forming property, a carboxyl group on its surface, and a reactivity with a divalent metal salt such that, when three volumes of an aqueous emulsion, of the fine particle of the polymer, having a fine particle concentration of 0.1% by weight, is brought into contact with one volume of an aqueous divalent metal salt solution having a concentration of 1 mol/liter, the time for the transmission of light at a wavelength of 700 nm to be decreased to 50% of the initial transmission is not more than $1 \times 10^4$, said fine particle of the polymer comprising 1 to 10% by weight of a structure derived from an unsaturated vinyl monomer having a carboxyl group and 0.2 to 4% by weight of a crosslinkable monomer-derived structure crosslinked by a crosslinkable monomer having two or more polymerizable double bonds, wherein an aqueous emulsion obtained by dispersing the fine particle of the polymer in water and having fine particle concentration of 10% by weight has a contact angle on a teflon sheet of not less than 70°.

11. The fine particle of a polymer according to claim 10, which has a core/shell structure.

12. The fine particle of a polymer according to claim 11, which is self-crosslinkable.

13. The fine particle of the polymer according to claim 12, wherein the core comprises a resin having an epoxy group with the shell comprising a resin having a carboxyl group.

14. The fine particle of the polymer according to claim 10, wherein the fine particle of the polymer has a minimum film-forming temperature of 30° C. or below.

15. An ink composition comprising a colorant, a fine particle of a polymer, a water-soluble organic solvent, and water, the fine particle of the polymer having a film-forming property, a carboxyl group on its surface, and a reactivity with a divalent metal salt such that, when three volumes of an aqueous emulsion, of the fine particle of the polymer, having a fine particle concentration of 0.1% by weight is brought into contact with one volume of an aqueous divalent metal salt solution having a concentration of 1 mol/liter, the time for the transmission of light at a wavelength of 700 nn to be decreased to 50% of the initial transmission is not more than $1 \times 10^4$ sec, the fine particle of the polymer comprising 1 to 10% by weight of a structure derived from an unsaturated vinyl monomer having a carboxyl group and 0.2 to 4% by weight of a crosslinkable monomer-derived structure crosslinked by a crosslinkable monomer having two or more polymerizable double bonds, wherein an aqueous emulsion obtained by dispersing the fine particle of the polymer in water and having fine particle concentration of 35% by weight has a surface tension of not less than $40 \times 10^{-3}$ N/m (20° C.).

16. The ink composition according to claim 15, wherein the fine particle of the polymer has a core/shell structure comprising a core and a shell.

17. The ink composition according to claim 16, wherein the fine particle of the polymer is self-crosslinkable.

18. The ink composition according to claim 17, wherein the core comprises a resin having an epoxy group with the shell comprising a resin having a carboxyl group.

19. The ink composition according to claim 15, wherein the fine particle of the polymer has a minimum film-forming temperature of 30° C. or below.

20. The ink composition according to claim 15, wherein the water-soluble organic solvent has a boiling point of 180° C. or above.

21. A fine particle of a polymer for use in an ink composition for ink jet recording, said fine particle of a polymer having a film-forming property, a carboxyl group on its surface, and a reactivity with a divalent metal salt such that, when three volumes of an aqueous emulsion, of the fine particle of the polymer, having a fine particle concentration of 0.1% by weight, is brought into contact with one volume of an aqueous divalent metal salt solution having a concentration of 1 mol/liter, the time for the transmission of light at a wavelength of 700 nm to be decreased to 50% of the initial transmission is not more than $1 \times 10^4$, said fine particle of the polymer comprising 1 to 10% by weight of a structure derived from an unsaturated vinyl monomer having a carboxyl group and 0.2 to 4% by weight of a crosslinkable monomer-derived structure crosslinked by a crosslinkable monomer having two or more polymerizable double bonds, wherein an aqueous emulsion obtained by dispersing the fine particle of the polymer in water and having fine particle concentration of 35% by weight has a surface tension of not less than $40 \times 10^{-3}$ N/m (20° C.).

22. The fine particle of a polymer according to claim 21, which has a core/shell structure.

23. The fine particle of a polymer according to claim 22, which is self-crosslinkable.

24. The fine particle of the polymer according to claim 23, wherein the core comprises a resin having an epoxy group with the shell comprising a resin having a carboxyl group.

25. The fine particle of the polymer according to claim 21, wherein the fine particle of the polymer has a minimum film-forming temperature of 30° C. or below.

* * * * *

UNITED STATES PATENT AND TRADEMARK OFFICE
CERTIFICATE OF CORRECTION

PATENT NO.    : 6,271,285 B1
DATED         : August 7, 2001
INVENTOR(S)   : Miyabayashi et al.

It is certified that error appears in the above-identified patent and that said Letters Patent is hereby corrected as shown below:

<u>Title page,</u>
Item [73], Assignee, "Tokyo-To" should read -- Tokyo -- and after "(JP)" insert
-- Mitsui Chemicals, Inc., Tokyo, (JP) --.

Signed and Sealed this

Third Day of December, 2002

JAMES E. ROGAN
*Director of the United States Patent and Trademark Office*